United States Patent [19]

Griffin

[11] 4,175,735
[45] Nov. 27, 1979

[54] DEVICE FOR ALIGNING PIPES TO BE JOINED

[76] Inventor: Jerry R. Griffin, 476 E. Blue Grass Rd., Mt. Pleasant, Mich. 48858

[21] Appl. No.: 918,466

[22] Filed: Jun. 23, 1978

[51] Int. Cl.² ............................................. B25B 5/14
[52] U.S. Cl. .................................................... 269/49
[58] Field of Search .................... 269/43, 47, 49, 243, 269/289 R; 29/271

[56] References Cited

U.S. PATENT DOCUMENTS

| | | | |
|---|---|---|---|
| 3,159,393 | 12/1964 | Villano | 269/49 |
| 3,875,645 | 4/1975 | Tucker et al. | 269/49 |
| 4,076,228 | 2/1978 | Sheldon | 269/49 |

Primary Examiner—Robert C. Watson
Attorney, Agent, or Firm—Gary, Juettner & Pyle

[57] ABSTRACT

A device for holding a pair of metal pipes, in order that the pipes may be joined end to end, clamps the pipes in coaxial relationship with adjacent ends thereof in close proximity with one another. The device is adjustable to accommodate pipes of differing outer diameters, and holds the pipes in aligned relationship for initially being joined at one or more points around their juncture. After the pipes have initially been joined, the device is then removable from the pipes to permit the same to be joined completely around their juncture.

6 Claims, 4 Drawing Figures

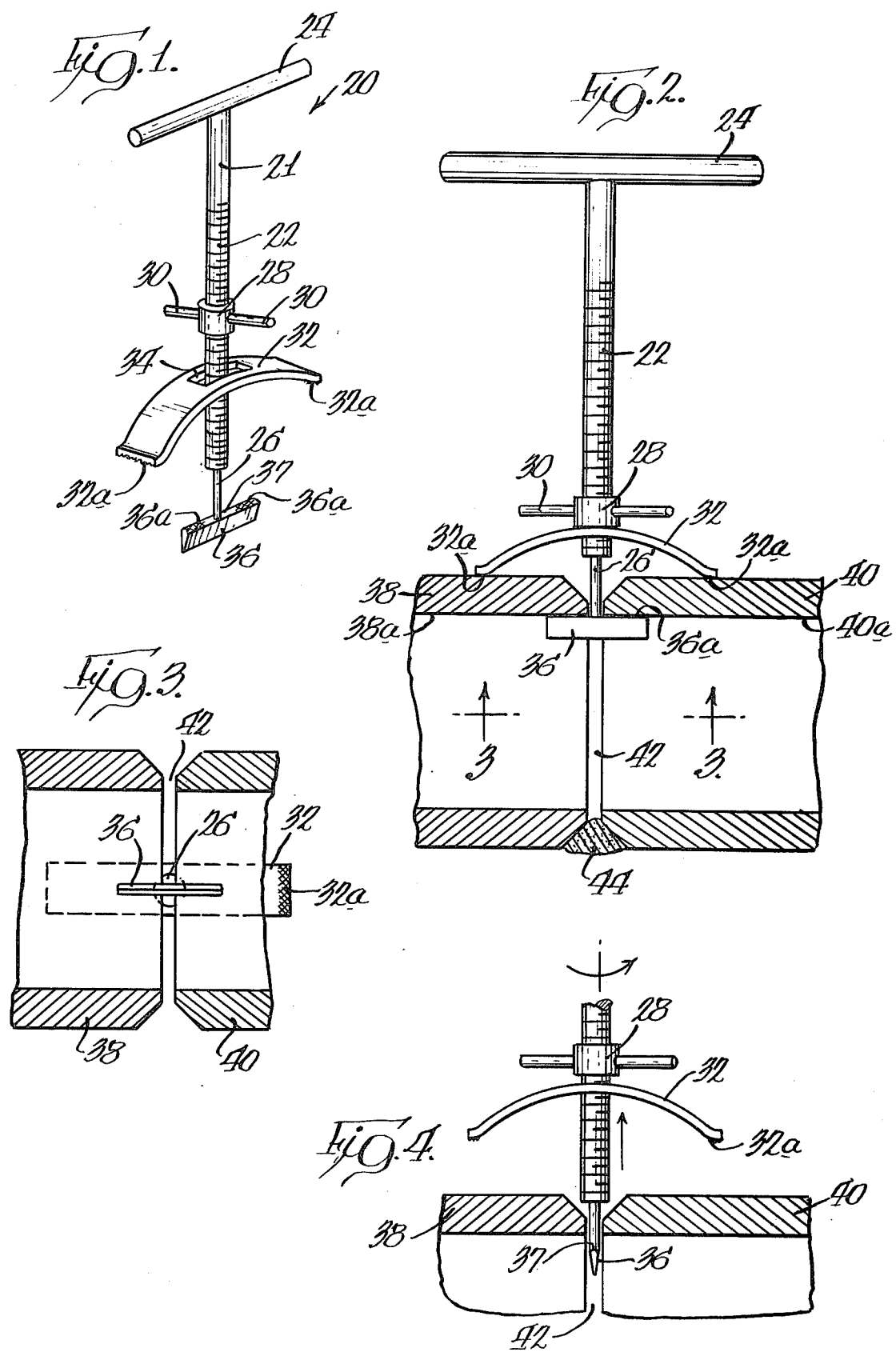

DEVICE FOR ALIGNING PIPES TO BE JOINED

BACKGROUND OF THE INVENTION

The present invention relates to a device for supporting a pair of pipes in coaxial end to end relationship in order that the pipes may be joined.

In plumbing and other manufacturing operations metal pipes are often joined end to end. When the pipes are of the type which are not joined by unions or other separate mechanical fasteners, but instead are joined by welding, some means must be provided for holding the pipes in end to end alignment in order that they may be joined. The positioning of the pipes may be accomplished by two individuals who each hold separate ones of the pipes with their ends abutting, while a third individual welds a connection therebetween. In the alternative, supports such as wooden beams may be employed to hold the pipes in aligned relationship while the same are welded. Irrespective of the particular means by which the pipes are positioned for joining, conventional techniques for accomplishing the positioning are, to say the least, generally cumbersome, inconvenient and time consuming, and usually require the combined efforts of more then one individual.

OBJECTS OF THE INVENTION

The primary object of the present invention is to provide a device that may be used by a single individual to quickly, accurately and conveniently clamp the ends of a pair of pipes to be joined in close proximity with one another and with the pipes in coaxial alignment.

SUMMARY OF THE INVENTION

In accordance with the present invention, a device for positioning a pair of pipes in aligned relationship end to end in order that the same may be joined by welding or the like, the pipes having passages therethrough of substantially equal diameter, comprises an inner pipe guide engageable with the surfaces of the pipe passages when adjacent pipe ends to be joined are in closely spaced relationship, an outer pipe guide engageable with the outer surfaces of the pipes when the ends are in the closely spaced relationship, and means for selectively moving the inner and outer pipe guides toward and away from each other to grip the pipes therebetween to hold the same in position for joining the ends thereof and for releasing the pipes for removal of the device therefrom.

In a preferred embodiment of the invention, the inner guide has a relatively long dimension and a relatively short dimension perpendicular thereto, and is rotatable to enable insertion and removal of the guide into and from the pipe passages through the space between the adjacent ends when the long dimension extends generally perpendicular to the lengths of the pipes, and to enable engagement of the guide with the passage surfaces when the guide is in the passages and the long dimension extends generally along the lengths of the pipes. The device includes an elongated rod, and the inner pipe guide is secured to one end of the rod and is extendable with the rod through the space between adjacent ends of the pipes. The outer pipe guide is movable along the rod, and the moving means provides for movement of the outer guide along the rod toward and away from the inner guide.

The outer guide is generally elongate and has a slot formed therethrough, and the rod extends through the slot and is formed with threads along at least the portion thereof normally exterior of the pipes. The moving means includes an adjustment lever threadably engaged with the rod and rotatable thereabout to selectively move the outer guide along the rod toward the inner guide, or to enable the outer guide to be moved away from the inner guide. The slot in the outer guide preferably is elongate along the length of the guide to enable pivotal movement of the guide about the rod, whereby movement of the guide against the outer surfaces of a pair of pipes having different outer diameters is accommodated.

Other objects, advantages and features of the invention will become apparent upon a consideration of the following detailed description, when taken in conjunction with the accompanying drawings.

BRIEF DESCRIPTION OF THE DRAWINGS

FIG. 1 is a perspective view of a device, structured in accordance with a preferred embodiment of the invention, for holding in position and aligning the ends of a pair of pipes to be joined by welding or the like;

FIG. 2 is a side elevation view showing the device holding a pair of pipes in end to end relationship in order that the pipes may be joined;

FIG. 3 is a view taken substantially along the line 3—3 of FIG. 2, illustrating the positions of a pair of clamping portions of the device when the ends of the pipes are held in aligned relationship, and FIG. 4 illustrates the manner of removal of the device from the pipes.

DETAILED DESCRIPTION

Referring to the drawings which illustrate salient features of a preferred embodiment of the invention, and in particular to FIG. 1, the device or the pipe clamp for aligning pipes to be joined, indicated generally at 20, comprises an elongated rod 21 having a threaded section 22 medially thereof, a "T" handle 24 at an upper end thereof, and a relatively narrow extension 26 at a lower end thereof. An adjustment lever 28 is threaded about and rotatably movable along the threaded section by means of a pair of handles 30, and an outer arcuate or generally semicircular pipe guide 32 is received around the rod by means of an elongated slot 34 formed in the guide. The slot is of a size to both permit the guide to freely move along the threaded section, and to pivot end to end with respect thereto. A relatively elongate but narrow wedge shaped inner pipe guide 36 having a relatively long dimension along its length, a relatively short dimension perpendicular thereto and a curved or arcuate upper surface 37 is connected with the lowermost end of the extension 26 generally medially of its length. The arrangement is such that upon clockwise rotation of the adjustment lever 28 (as viewed from above) the pipe guides 32 and 36 are moved toward each other, and upon counterclockwise rotation of the adjustment lever the guides are free to move away from each other.

In use of the pipe clamp of the invention, and referring also to FIGS. 2 and 3, to clamp or hold a pair of pipes 38 and 40 in end to end aligned relationship in order that the pipes may be joined, the adjustment lever 28 is moved upward along the threaded section 22 toward the handle 24 to permit the outer and inner pipe guides 32 and 36 to be moved apart. The pipes are then moved together to a closely spaced relationship about the extension 26 with the inner pipe guide 36 to the interior of the pipes and with the outer pipe guide 32 to the exterior of the pipes. To this end, when moved together the ends of the pipes define a space 42 therebetween which is relatively small, yet is of a width greater than either the diameter of the relatively narrow extension 26 or the relatively small side to side dimension of the inner guide 36.

At this point the pipes 38 and 40 are only roughly aligned with one another. To coaxially align the pipes and to secure the same against movement with the ends thereof closely spaced in order that they may be joined by welding or the like, the adjustment lever 28 is then rotated clockwise to move the outer pipe guide 32 toward the inner guide 36. With continued movement of the guides 32 and 36 together, knurled gripping surfaces 32a at the ends of the outer guide 32 engage against the outer peripheries of the pipes, and knurled end faces 36a of the inner guide 36 engage against the surfaces of the passages through the pipes, with the curved surface 37 of the guide 36 generally conforming with the curved surfaces of the passages. The slot 34 in the outer guide 32 accommodates pivoting movement of the guide about the threaded section 22 in the event that the pipes 38 and 40 are of different outer diameters, and upon complete tightening of the adjustment lever 28 the inner guide 36 moves the pipes into coaxial alignment, and with the outer guide clamps the ends of the pipes in closely spaced aligned relationship. To this end it is noted that the wedge or V shape of the inner guide imparts strength and rigidity thereto, whereby the guide does not bend or deform during its clamping function.

To this end, and although only a single pipe clamp 20 is illustrated and described, it is to be understood that alignment and clamping of the pipes may advantageously be accomplished with the use of two or more of the pipe clamps, for example two at 180° spacings around the pipe or three at 120° spacings. The use of multiple pipe clamps, of course, provides improved support for the ends of the pipes and ensures that the space 42 between the ends is maintained uniform around the circumference of the pipes, whereby axial alignment of the pipes is ensured.

FIG. 3, along with FIG. 2, shows the positioning of the outer and inner pipe guides 32 and 36 when the ends of the pipe are clamped in aligned relationship. At this time the pipes guides each extend lengthwise generally along the axes of the pipes. As previously stated, when the pipe ends are moved together the space 42 is maintained greater than either the diameter of the extension 26 or the thickness of the inner pipe guide 36. Thus, in the initial positioning of the pipe clamp 20 about the ends of the pipes 38 and 40, the pipes could first be moved together in general alignment to define the space 42 therebetween, whereafter the inner guide 36 could be positioned to interior of the pipes by first orienting the same with its length generally perpendicular to the axes of the pipes and lying within the plane of the space 42, by extending the guide and the extension 26 through the space to position the guide within the pipes, and by then rotating the rod 21 to turn the guide to extend its length generally along the axes or lengths of the pipes. Accordingly, the pipes 38 and 40 may either be moved together about the pipe clamp, or the pipes may be positioned in close proximity with each other and the pipe clamp then moved into engagement therewith.

With the ends of the pipes 38 and 40 firmly clamped in aligned relationship as shown in FIGS. 2 and 3, the pipe ends may be temporarily secured together, as for example by tack welds 44. To this end, the pipe ends advantageously are tapered to form a "V" shaped recess therebetween to accommodate the welding material and to facilitate joining of the pipes. Where multiple pipe clamps 20 are employed to clamp the ends of the pipes, a single tack weld 44 positioned medially of each adjacent pair of pipe clamps is generally sufficient to secure or join the pipes together in their aligned orientation.

After the tack welds have been made about the pipe ends, as shown in FIG. 4 the pipe clamp or clamps may readily be removed from the pipes, with the tack welds then continuing to hold the pipes together. Removal of each pipe clamp is accomplished simply by rotating the adjustment lever 28 counterclockwise to enable the outer and inner guides 32 and 36 to be moved apart and out of clamping engagement with the pipes. This frees the inner guide 36 for rotation within the passages through the pipes, whereupon the handle 24 may be turned to rotate the guide perpendicular to the axes of the pipes and within the plane of the space 42. The inner guide and the extension 26 may then be withdrawn from between the pipes through the space. Thereafter, and after all of the pipe clamps have been removed, a weld may be made around the entire circumference of the pipe ends to close the space 42 and to seal and join the pipes together in coaxial alignment.

The invention thus provides an improved means for conveniently and economically clamping together the ends of pipes to enable the same to be joined, while simultaneously ensuring coaxial alignment of the pipes. By virtue of the ease of operation of the pipe clamp, joining of the ends of pipes may be accomplished by a single individual and without the need for elaborate or cumbersome exterior supports for the pipes.

While one embodiment of the invention has been described in detail, various modifications and other embodiments thereof may be devised by one skilled in the art without departing from the spirit and the scope of the invention, as defined by the appended claims.

What is claimed is:

1. A device for positioning a pair of pipes in aligned relationship end to end in order that the ends may be joined by welding or the like, the pipes having passages therethrough of substantially equal diameter, comprising an inner pipe guide engageable with the surfaces of the pipe passages when adjacent pipe ends to be joined are in closely spaced relationship; an outer pipe guide engageable with the outer surfaces of the pipes when the adjacent ends are in the closely spaced relationship, and means for selectively moving said inner and outer guides toward and away from each other to grip the pipes therebetween to hold the same in position for joining the ends thereof and for releasing the pipes for removal of the device therefrom, said inner pipe guide having a relatively long dimension and a relatively short dimension or thickness perpendicular thereto enabling insertion and removal of said inner guide into and from the pipe passages through the space between adjacent ends of the pipes when said long dimension extends generally perpendicular to the lengths of the pipes, and enabling engagement of said inner guide with the pipe passage surfaces when said guide is in the passages and said long dimension extends generally along the lengths of the pipes, and including an elongated rod, said inner pipe guide being secured to one end of said rod and said outer pipe guide being movable along said rod, said moving means providing for movement of said outer guide along said rod toward and away from said inner guide, said inner guide and said rod thereat being extendable through the space between the adjacent ends of the pipes, said outer pipe guide being generally elongate and having a slot formed therethrough, said rod extending through said slot and being formed with threads at least along a medial portion thereof normally exterior of the pipes, said moving means including an adjustment lever threadably engaged with said threaded portion of said rod and rotatable to selectively move said outer guide along said rod toward said inner guide or to enable said outer guide to be moved along said rod away from said inner guide.

2. A device as in claim 1, said slot in said outer guide being elongate along the length of said outer guide to enable pivotal movement of said outer guide about said rod, thereby accommodating movement of said outer guide against the outer surfaces of a pair of pipes having differing outer diameters.

3. A device for positioning and releasably clamping in position a pair of pipes in order to join the same end to end as by welding, the pipes having passages therethrough of substantially like diameter, an elongated rod having threads formed along at least a portion thereof; an inner pipe guide connected with one end of the rod, said guide having a long dimension and a short dimension perpendicular thereto and being connected with said one end of said shaft generally medially of said long dimension; an outer pipe guide having a long dimension, a short dimension generally perpendicular thereto, and a slot formed generally medially therethrough, said rod extending through said slot; and adjustment means threaded with said threaded portion of said rod to the side of said outer guide opposite from said inner guide and rotatable about said rod to selectively move said outer guide along said rod toward said inner guide or to enable said outer guide to be moved along said rod away from said inner guide, said inner guide for being positioned in the pipe passages with its long dimension generally along the length of the pipes and said outer guide for being positioned to exterior of the pipes with its long dimension generally along the length of the pipes when the pipe ends to be joined are in closely spaced relationship with the portion of the rod toward the inner guide extending between the pipes, said adjustment means then being operable to move said outer guide toward said inner guide to engage the outer surfaces of the pipes with said outer guide and the passage surfaces with said inner guide to coaxially align the pipes and clamp the same in position for joining the ends thereof, said adjustment means then being operable after the ends are joined to unclamp the pipes and free said inner guide for rotation with said rod to extend its long dimension generally perpendicular to the lengths of the pipes, the short dimension of said inner guide being no greater than the diameter of said rod thereat, whereby said inner guide may be withdrawn from said pipes through the space between the ends thereof.

4. A device as in claim 3, said slot in said outer guide being elongate along the long dimension thereof to enable said guide to pivot about said rod to accommodate clamping of a pair of pipes of differing outer diameters.

5. A device as in claim 3, including a handle at an end of said rod opposite from said inner guide for manipulating said rod and for rotating the same to rotate said inner guide in the pipe passages to positions with its long dimension generally parallel or perpendicular to the lengths of the pipes.

6. A device as in claim 3, the long dimension of said outer pipe guide defining a curved surface curving toward said inner guide, said inner guide being wedge or V shaped and having a curved surface for generally conformably engaging the surfaces of the passages through the pipes.

* * * * *